GATING CIRCUIT

Filed May 10, 1952

INVENTOR
C. O. MALLINCKRODT
BY M. R. McKenney
ATTORNEY

United States Patent Office 2,695,956

Patented Nov. 30, 1954

2,695,956

GATING CIRCUIT

Charles O. Mallinckrodt, Palos Verdes Estates, Calif., assignor to Bell Telephone Laboratories, Incorporated, New York, N. Y., a corporation of New York Application May 10, 1952, Serial No. 287,210

10 Claims. (Cl. 250—27)

This invention relates to electronic gating circuits and in particular to the elimination or reduction of voltage variations at the output of such a gate due to the gating voltage.

It is an object of the invention to reduce the effect of transients and in particular transients caused by the gating voltage at the output of an electronic gate. Other objects relate to the improvement of electronic gating circuits in general and balanced electronic gates in particular.

The invention is described below as relating to a known type of balanced electronic gate; the balance prevents the appearance of the gating voltage at the output of the gate in the form of a pedestal. A difficulty which has arisen with such gates is that although the pedestal is eliminated, transients due to the gating voltage may appear in the output; if means were not employed to reduce these transients, the advantage gained by the reduction of the pedestal would be appreciably offset. In accordance with the invention, such transients are reduced and practically eliminated by the addition of but a few circuit elements.

The invention, its objects, and features may be better understood from a consideration of the following detailed description when read in accordance with the attached drawing, in which.

Figure 1:
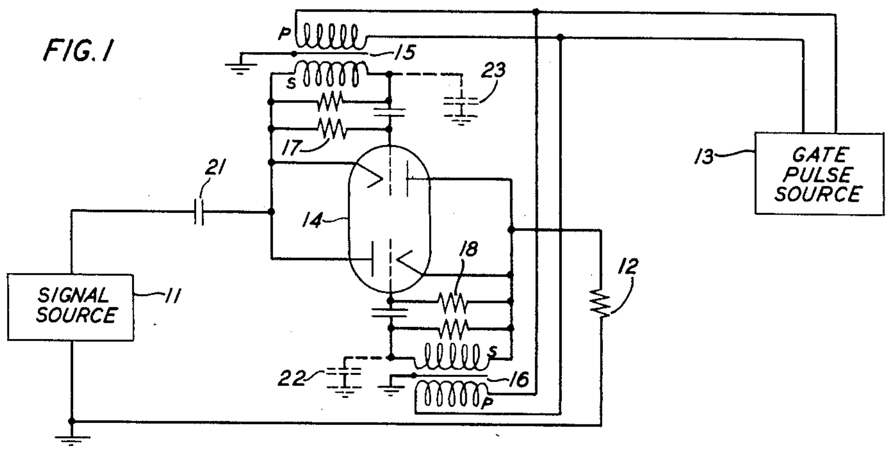
Fig. 1 is a schematic diagram of a balanced electronic gate to which principles of the invention may be applied.

The gate illustrated in Fig. 1 is a self-balancing device which produces no pedestal at its output when the gating voltage is applied. This circuit may be employed, for example, to gate segments of a signal voltage from the source 11 to a load 12 in a pulse communication system. If the gating pulses supplied by the gate pulse source 13 are periodic, the circuit will convert the signal voltage supplied by the source 11 into a train of evenly spaced amplitude modulated pulses.

The central element of the gate is the twin triode 14 which is connected so as to provide conductive paths in opposite directions between signal source 11 and the load 12. During the gating interval, the two halves of the twin triode are rendered conducting by positive pulses applied to their grids through the shielded pulse transformers 15 and 16. The secondaries of these transformers are terminated by the resistors 17 and 18. Between gating intervals, the tubes are held beyond cutoff by negative bias developed across the grid-leak resistors 19 and 20 by rectified grid current. Consequently, current flows from the signal source 11 to the load 12 only during the gating intevals. Since current can flow through the gating tube in either direction, the pulses which appear across the resistor 12 will be positive or negative in accordance with the polarity of the signal voltage.

The condenser 21 serves to balance the circuit automatically. This condenser is made sufficiently large so that the voltage produced across it by the current flow during a single gating interval is negligible compared to the signal voltage. This condenser charges to a voltage caused by mismatch between the two halves of the twin triode 14 and charges during successive gating intervals until charged to this voltage. When the condenser 21 has been charged, there will be no residual pulse across the load resistor 12 when the signal source voltage is zero. Similarly, the charge on the condenser 21 will automatically adjust to balance out any direct current voltage associated with the signal source 11.

Figure 3A:
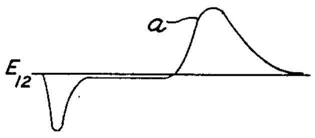
Figs. 3A, 3B, and 3C illustrate wave forms illustrative of Fig. 2.
Figure 3B:
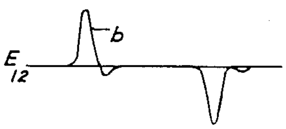
Figure 3C:
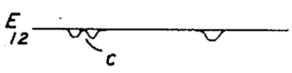

The quiescent voltage across the load resistor 12 is designated $E_{12}$ and is represented by the axis for the wave forms in Figs. 3A, 3B, and 3C; this voltage should remain unchanged when the gating voltage is applied in the absence of input signals. Applicant has found, however, that the actual wave form across resistor 12 when the gating voltage is applied is more nearly that represented by the wave form *a* in Fig. 3A, it being assumed that the signal source voltage is zero.

Applicant has traced the transient peaks corresponding to the beginning and end of the gating interval to the secondary *s* of transformer 16. This winding is coupled to ground, the nominal point of reference potential, by a substantial capacitance represented by capacitor 22. This capacitance provides a closed circuit through the winding and the load resistor 12, which is also grounded. The transient peaks, therefore, represent the charging and discharging of this effective capacitance 22 through resistor 12. In other words, the rectangular gating pulses in the secondary *s* are differentiated and coupled directly to the load 12. The secondary *s* of transformer 15 is also capacitively coupled to ground, which capacitance is represented by a capacitor 23. Transients produced in the circuit completed by this capacitance to ground are not coupled directly to the load, however, but are attenuated by the forward loss of the twin triodes 14. These latter transients will therefore appear mainly at the output of the signal source 11; the transient peaks illustrated by wave form *a* in Fig. 3A are therefore caused primarily by the transformer 16.

Figure 2:
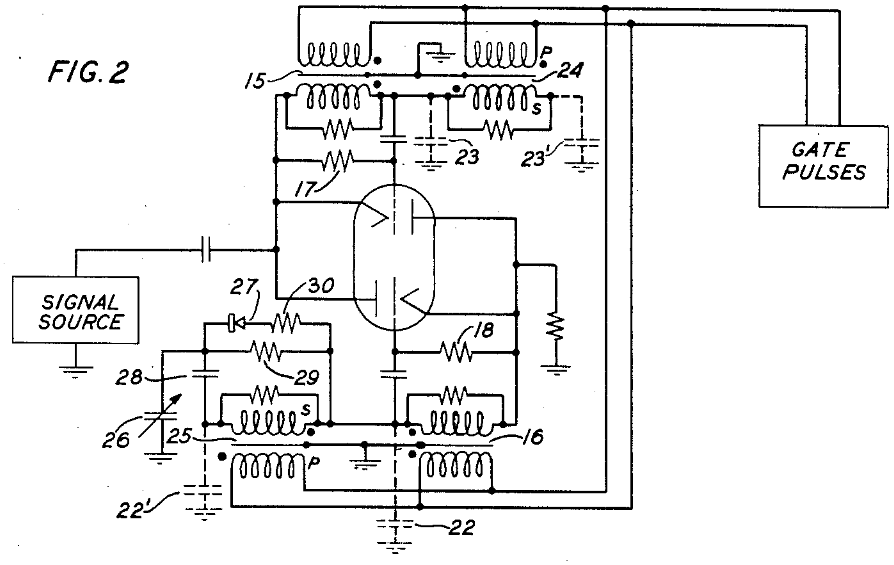
Fig. 2 is a schematic diagram of a similar gate modified in accordance with the invention.

These transients may be reduced in accordance with the invention by the addition of a second pair of shielded transformers 24 and 25, as illustrated in Fig. 2. The secondaries of transformers 24 and 25 are poled oppositely to the secondaries of transformers 15 and 16, respectively. These windings, also coupled to ground by capacitance represented by capacitors 22' and 23', produce transients of opposite polarity to those produced by transformers 15 and 16, and tend to balance out the latter. A fine adjustment of the balance may be obtained by the trimmer condenser 26, which is small relative to the effective capacitance to ground 22'. This capacitor provides a limited control over the magnitude of the balancing transient produced by transformer 25. With the addition of the transformers 24 and 25 and capacitor 26, the transients in the load 12 were reduced in a particular embodiment to the approximate wave form *b* shown in Fig. 3B, representing an appreciable reduction over those illustrated in Fig. 3A.

In accordance with another principle of the invention, the gating transients at the load may be further reduced by the addition of a rectifier 27, which may, for example, comprise a germanium of silicon crystal diode, capacitor 28, and resistors 29 and 30. The rectifier 27 and resistors 29 and 30 simulate the effect of the rectified grid current which flows in the secondary *s* of transformer 16. Resistor 29 is approximately the same size as the grid-leak resistor 18, while resistor 30 is relatively small. Capacitor 28 blocks the flow of this rectified current from the secondary *s* of transformer 25. The addition of these further elements reduced the gating transient at the load to the small ripples illustrated by the wave form *c* in Fig. 3C; this small ripple will generally be tolerable.

The addition of circuitry similar to capacitors 26, 20, and 28 and rectifier 27 and resistors 29 and 30 to transformer 24 will probably be unnecessary for most purposes, although further improvement may be had, if desired, by the addition of such circuitry. Sufficient improvement may also be had for a particular purpose with the addition of only transformer 25 and its associated circuitry, particularly if the forward loss of the gate in the On condition is relatively large.

In conclusion, the unwanted transients are reduced to a tolerable level by the addition of but a pair of transformers, a crystal rectifier, and a few resistors and capacitors. Although the invention has been described as relating to a particular embodiment, other embodiments and modifications will readily occur to one skilled in the art so that the invention should not be deemed limited to the circuits or the type gate specifically described. It may be expedient, for example, to replace the two pairs of transformers with two transformers, each having two oppositely poled secondary windings.

What is claimed is:

1. The combination with a gating circuit comprising a pair of oppositely poled normally non-conducting vacuum tubes connected in parallel between a signal source and a load, a source of gating pulses, and means for applying said gating pulses to said vacuum tubes to render said tubes conducting comprising a pair of transformers each having a primary and a secondary winding, means connecting said source of gating pulses to said primary windings, and means connecting said secondary windings to said vacuum tubes, of means for reducing the effect of gating transients comprising a pair of auxiliary transformer windings connected to said secondary windings, and means for coupling said gating pulses to said pair of auxiliary windings with the opposite polarity with which they are coupled to said secondary windings.

2. In combination, a gating circuit comprising a pair of oppositely poled normally non-conducting vacuum tubes connected in parallel between a source of signals and a load, means for rendering said vacuum tubes conducting comprising a source of gating pulses and a first pair of transformers coupling said source of gating pulses to said vacuum tubes, and means for reducing the effect of gating transients which comprise a second pair of transformers coupling said source of gating pulses to said vacuum tubes, said second pair of transformers oppositely poled with respect to said first pair of transformers.

3. The combination with a gating circuit comprising a pair of oppositely poled normally non-conducting vacuum tubes connected in parallel between a source of signals and a load circuit, said vacuum tubes each having at least a cathode, a control grid, and an anode, means for rendering said vacuum tubes conducting comprising a source of gating pulses, a pair of transformers each having a primary and a secondary winding, means connecting each of said secondary windings between the grid and cathode of one of said vacuum tubes, means for applying said gating pulses to said primary windings, the windings of said transformers poled to apply voltages of like polarity between said grids and said cathodes, and means for reducing the effect of gating transients which comprise an auxiliary winding connected to one of said secondary windings, and means for coupling said gating pulses into said auxiliary winding with a polarity opposite to the polarity with which said gating pulses are coupled into said one of said secondary windings.

4. The combination in accordance with claim 3 and a second auxiliary winding connected to the other of said secondary windings and means for coupling said gating pulses into said second auxiliary winding with a polarity opposite to the polarity with which said gating pulses are coupled into said other of said secondary windings.

5. The combination in accordance with claim 3 and means for terminating said auxiliary winding in a circuit including a rectifier element.

6. The combination in accordance with claim 3 wherein said load circuit is connected to a point of reference potential and a variable capacitor connecting said auxiliary winding to a similar point of reference potential.

7. In combination, a source of signals, a load circuit connected to a point of reference potential, a circuit for controllably gating energy from said source to said load circuit comprising a pair of oppositely poled space discharge devices each having at least an anode, a control grid, and a cathode and connected in parallel between said source and said load, a pair of transformers each having primary and secondary windings, means connecting the secondary winding of each of said transformers between the grid and cathode of one of said space discharge devices, a source of gating voltage, means for applying said gating voltage to the primary windings of said transformers, said transformers characterized by appreciable inherent capacitive coupling between their secondary windings and said point of reference potential giving rise to undesirable transients in said load circuit due to said gating voltage, means for reducing the effect of said transients comprising an auxiliary transformer winding connected to the grid side of the secondary winding of the transformer connected in the grid-cathode circuit of the space discharge device whose cathode is connected to said load, and means for coupling said gating voltage into said auxiliary winding with the opposite polarity with which it is coupled into the said last-named secondary winding.

8. The combination in accordance with claim 7 and a branch circuit shunting said auxiliary winding, said branch circuit including a rectifier element shunted by a resistor.

9. The combination in accordance with claim 7 and a variable capacitor connected between said auxiliary winding and said reference potential.

10. In combination, a gating circuit susceptible to gating transients connected between a signal source and a load circuit, a gate control circuit comprising a source of gating pulses and means for applying said gating pulses to said gating circuit, and means for reducing said gating transients comprising an auxiliary circuit responsive to applied pulses for creating transients similar to said gating transients, means for applying said gating pulses directly to said auxiliary circuit and means for applying said created transients to said gate control circuit in phase opposition to said gating transients.

References Cited in the file of this patent

UNITED STATES PATENTS

| Number | Name | Date |
| --- | --- | --- |
| 2,599,675 | Volz | June 10, 1952 |